(12) United States Patent
Kim et al.

(10) Patent No.: US 10,818,986 B2
(45) Date of Patent: Oct. 27, 2020

(54) BATTERY-COOLING DEVICE FOR VEHICLE AND MANUFACTURING METHOD OF SAME

(71) Applicants: Hyundai Motor Company, Seoul (KR); Kia Motors Corporation, Seoul (KR)

(72) Inventors: Tae Hyuck Kim, Chungcheongnam-do (KR); Hae Kyu Lim, Gyeonggi-do (KR); Yong Hwan Choi, Gyeonggi-do (KR); Yong Jae Kim, Gyeonggi-do (KR); Yeon Man Jeong, Gyeonggi-do (KR); Yong Jin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/154,820

(22) Filed: Oct. 9, 2018

(65) Prior Publication Data
US 2019/0379094 A1    Dec. 12, 2019

(30) Foreign Application Priority Data
Jun. 8, 2018  (KR) .......................... 10-2018-0066160

(51) Int. Cl.
*H01M 2/14* (2006.01)
*H01M 10/625* (2014.01)
(Continued)

(52) U.S. Cl.
CPC ........... *H01M 10/625* (2015.04); *B60L 58/26* (2019.02); *H01M 10/613* (2015.04); *H01M 10/6568* (2015.04); *H01M 2220/20* (2013.01)

(58) Field of Classification Search
None
See application file for complete search history.

(56) References Cited

U.S. PATENT DOCUMENTS

2017/0352934 A1* 12/2017 Kim .................. H01M 10/6556

FOREIGN PATENT DOCUMENTS

KR    10-2015-0002982         1/2015
KR    10-2016-0105360 A       9/2016
(Continued)

OTHER PUBLICATIONS

Extended European Search Report for European Patent Application No. 18200230, dated Apr. 25, 2019, 9 pages.

*Primary Examiner* — Yoshitoshi Takeuchi
(74) *Attorney, Agent, or Firm* — Mintz Levin Cohn Ferris Glovsky and Popeo, P.C.; Peter F. Corless (57) ABSTRACT

A battery-cooling device for a vehicle is provided. The device includes a plurality of frames provided with battery cells mounted thereto and having apertures provided in opposite side surfaces of lower ends of the frames. A pipe is inserted through the apertures. A coolant inlet is mounted on a first side surface of a lower end of each of the plurality of frames and communicates with a first end of the pipe. A coolant is introduced into the coolant inlet. Additionally, a coolant outlet is mounted on a second side surface of the lower end of each of the plurality of frames and communicates with a second end of the pipe. The coolant is then discharged from the coolant outlet.

9 Claims, 8 Drawing Sheets

(51) Int. Cl.
*H01M 10/613* (2014.01)
*H01M 10/6568* (2014.01)
*B60L 58/26* (2019.01)

(56) References Cited

FOREIGN PATENT DOCUMENTS

WO   WO-2016208925 A1 * 12/2016 ........ H01M 10/6556
WO   2018/080010 A1   5/2018

* cited by examiner

FIG. 1

RELATED ART

BATTERY-COOLING DEVICE FOR VEHICLE AND MANUFACTURING METHOD OF SAME

CROSS REFERENCE TO RELATED APPLICATION

The present application claims priority to Korean Patent Application No. 10-2018-0066160, filed Jun. 8, 2018, the entire contents of which is incorporated herein for all purposes by this reference.

BACKGROUND

Field of the Invention

The present invention relates generally to a battery-cooling device for a vehicle and a manufacturing method of the same, wherein a battery-cooling device having a simplified structure shows improved cooling performance due to the use of an indirect water-cooling method.

Description of the Related Art

Generally, as electric vehicles or hybrid vehicles are developed, the importance of batteries is increasing. This interest in batteries is expanding to factors influencing battery efficiency and battery life as well as battery capacities. High-voltage/high-capacity batteries used in electric vehicles or hybrid vehicles are generally configured as one battery pack including a plurality of battery cells, and a plurality of battery pack are provided to constitute all of the batteries.

Since the battery packs are provided together in a limited narrow space, high heat is produced in the battery packs, which has an adverse impact on the life of the batteries. Accordingly, a cooling system is required to control the high heat produced in high-voltage/high-capacity batteries used in electric vehicles or hybrid vehicles. Generally, a high-voltage/high-capacity battery cooling method used in a vehicle is divided into an air-cooling method and a water-cooling method, and in turn, each method is divided into an indirect cooling method and a direct cooling method.

Figure 1:
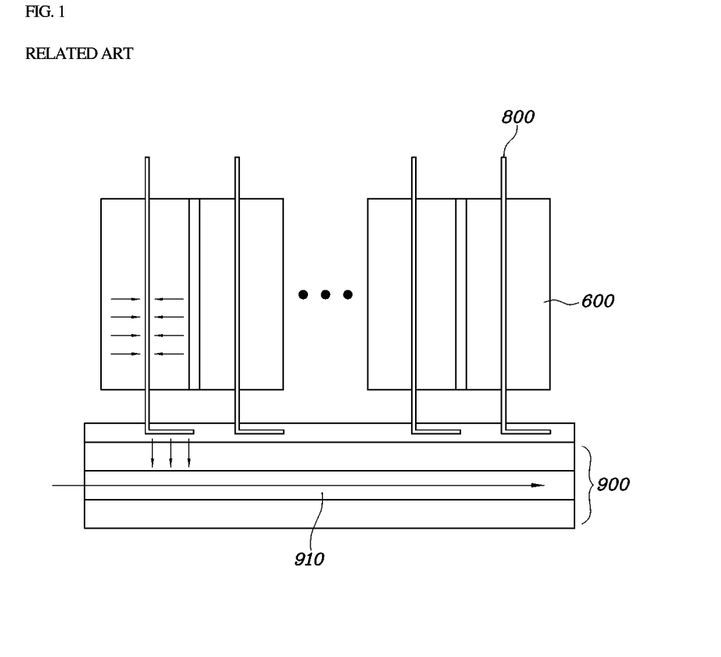
FIG. 1 is a cross-sectional view showing a conventional high-voltage battery cooling method according to the related art.

Meanwhile, referring to FIG. 1 of the related art, a conventional high-voltage battery cooling method is an indirect water-cooling method that cools battery cells by transferring heat produced in the battery cells 600 to a cooling plate 800 that is in contact with the battery cells, and the cooling plate transfers the heat to a thermal interface material (TIM) and a water-cooling block 900. However, in the conventional cooling method, the cooling method changes considerably depending on the state of contact among the cooling plate, the TIM, and the water-cooling block. Accordingly, when the parts are assembled, it is required to have even contact among the battery cells, the cooling plate, the TIM, and the water-cooling block, but due to assembly tolerances, there is limitation in realizing even contact while assembling the plurality of battery cells.

SUMMARY

Accordingly, the present invention provides a battery-cooling device for a vehicle and a manufacturing method of the same, wherein a battery-cooling device having a simplified structure exhibits improved cooling performance due to the use of an indirect water-cooling method.

According to one aspect of the present invention, a battery-cooling device for a vehicle may include: a plurality of frames having battery cells mounted thereto and apertures provided in opposite side surfaces of lower ends of the frames; a pipe inserted through the apertures; a coolant inlet combined or mounted on a first side surface of a lower end of each of the plurality of frames and communicating with a first end of the pipe, a coolant being introduced into the coolant inlet; and a coolant outlet combined or mounted on a second side surface of the lower end of each of the plurality of frames and communicating with a second end of the pipe, the coolant being discharged from the coolant outlet.

The battery-cooling device may further include a thermal interface material inlet provided at upper sides of the apertures while disposed in each of opposite side surfaces of the frame, with a thermal interface material, which has a characteristic of a thermal interface, being introduced into the thermal interface material inlet. The thermal interface material inlet may be inclined downwards from each of the opposite side surfaces of the frame. Additionally, the thermal interface material introduced into the thermal interface material inlet may be applied to a portion of a lower end of each of the battery cells and to the pipe. The frame may include a pipe support part disposed on a lower surface thereof, the pipe support part supporting the pipe inserted through the apertures. The battery-cooling device may further include a frame cover that covers open surfaces of the frames after the plurality of frames is laminated.

According to another aspect of the present invention, a manufacturing method of a battery-cooling device for a vehicle may include: providing a plurality of frames having apertures provided in opposite side surfaces of lower ends of the frames, and having thermal interface material inlets provided at upper sides of the apertures, with a thermal interface material, which has a characteristic of a thermal interface, being introduced into the thermal interface material inlets; inserting a pipe through the apertures in each of the frames; mounting battery cells to the plurality of frames; laminating the plurality of frames having the battery cells mounted thereto; and covering open surfaces of the laminated frames with frame covers. The manufacturing method may further include introducing the thermal interface material into the thermal interface material inlets and hardening the thermal interface material after covering the open surfaces of the laminated frames with the frame covers.

According to the present invention, the battery-cooling device may include the frame and a water-cooling block, which includes a cooling flow path, integrally configured such that the frame has the apertures provided in the opposite side surfaces of the lower end thereof, and the pipe may be inserted through the apertures, which simplifies the structure of the battery-cooling device, thereby further reducing manufacturing costs and improving energy density compared to a conventional battery-cooling device.

In addition, in the battery-cooling device according to the present invention when the plurality of frames is laminated to form one battery module, the pipe, the coolant inlet, and the coolant outlet may include the cooling flow path in the battery module, thereby having a more simplified configuration and reducing manufacturing costs compared to a conventional battery-cooling device which requires an additional cooling block including a cooling flow path other than the battery module.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinbelow, a battery-cooling device for a vehicle according to an exemplary embodiment of the present invention will be described with reference to the accompanying drawings.

Figure 2:
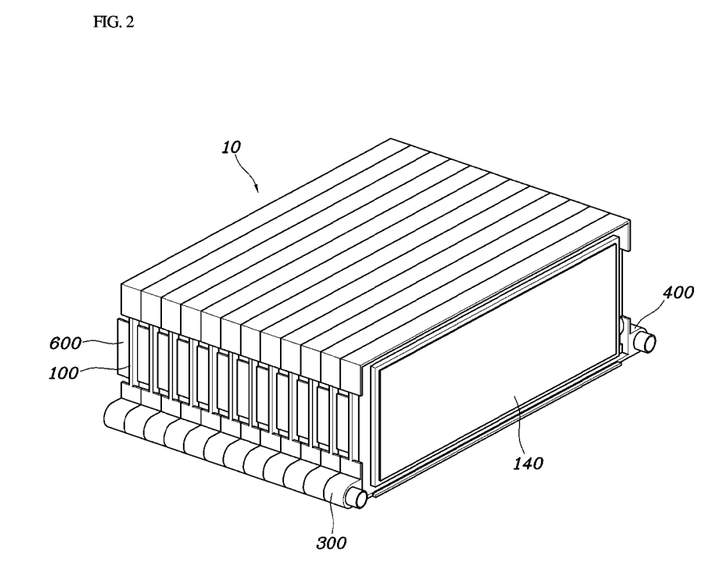
FIG. 2 is a perspective view of a battery-cooling device for a vehicle according to an exemplary embodiment of the present invention.
Figure 3:
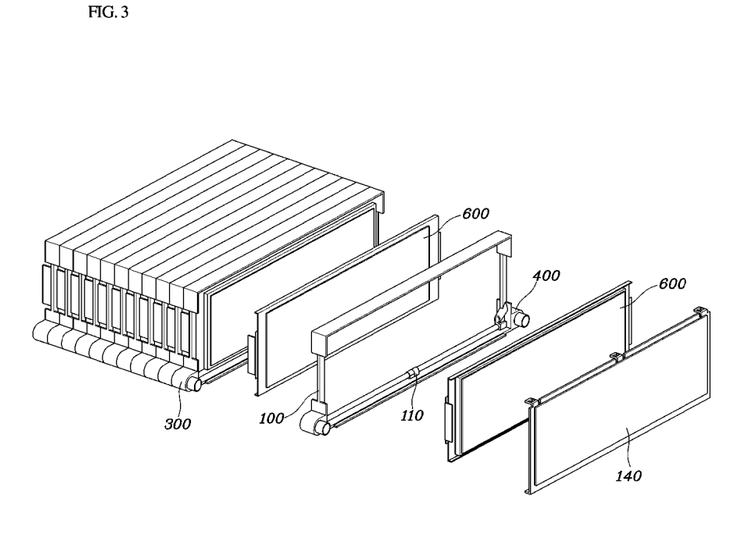
FIG. 3 is a detailed view of the battery-cooling device according to an exemplary embodiment of the present invention.
Figure 4:
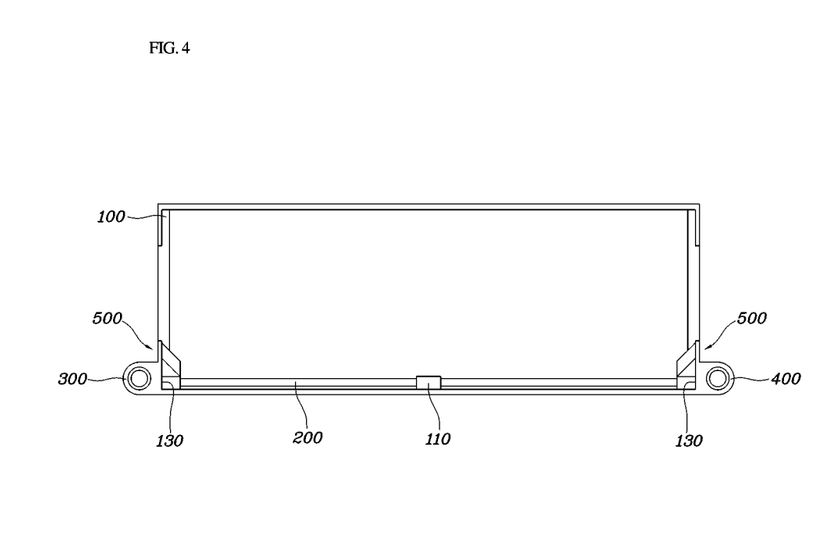
FIG. 4 is a clubs-sectional view showing a frame of the battery-cooling device according to an exemplary embodiment of the present invention.
Figure 5:
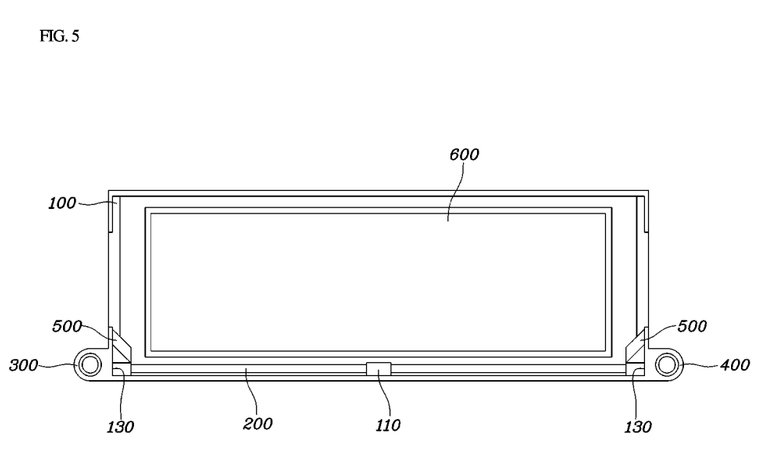
FIG. 5 is a cross-sectional view showing a battery cell mounted to the frame in the battery-cooling device according to an exemplary embodiment of the present invention.
Figure 6:
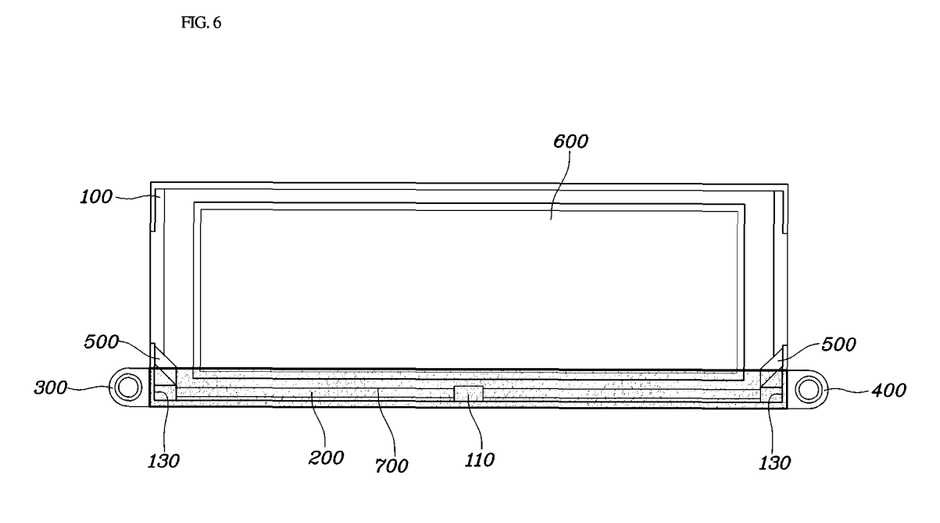
FIG. 6 is a cross-sectional view showing a thermal interface material introduced into thermal interface material inlets after the battery cell is mounted to the frame in the battery-cooling device according to an exemplary embodiment of the present invention.
Figure 7:
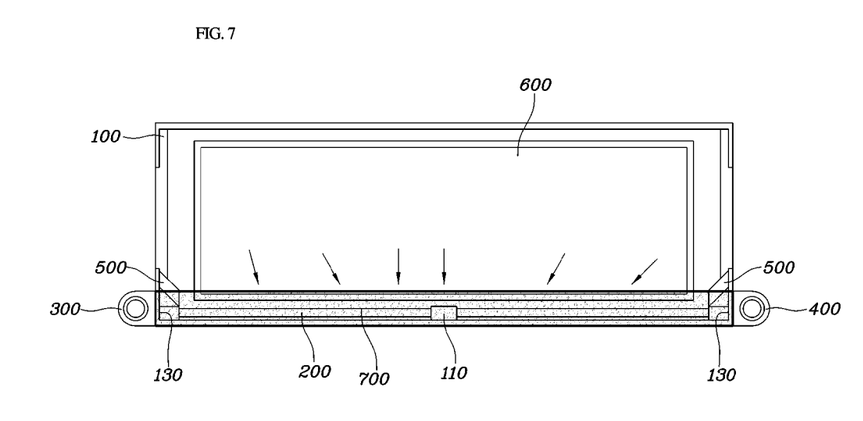
FIG. 7 is a clubs-sectional view showing heat transfer performed when heat is produced in the battery cell in the battery-cooling device according to an exemplary embodiment of the present invention.

According to an exemplary embodiment of the present invention, FIG. 2 is a perspective view of the battery-cooling device for a vehicle, FIG. 3 is a detailed view of the battery-cooling device, FIG. 4 is a clubs-sectional view showing a frame of the battery-cooling device, FIG. 5 is a cross-sectional view showing a battery cell mounted to the frame, FIG. 6 is a cross-sectional view showing a thermal interface material (TIM) introduced into TIM inlets after the battery cell is mounted to the frame, and FIG. 7 is a clubs-sectional view showing heat transfer performed when heat is produced in the battery cell.

As shown in FIGS. 2 and 3, according to the present invention, the battery-cooling device 10 for a vehicle may include a plurality of frames 100, pipes 200, coolant inlets 300, and coolant outlets 400, and may further include the TIM inlets 500. In particular, the frame 100 may include battery cells 600 mounted thereto. As shown in FIG. 4, the frame 100 may include apertures 130 provided in opposite side surfaces of a lower end thereof. Each of the pipes 200 may be inserted through the apertures 130 provided in the opposite side surfaces of the lower end of the frame 100.

The pipe 200, which is a thermally conductive pipe, may function as a cooling flow path through which the coolant may flow. Accordingly, the battery-cooling device may include the frame 100 and the water-cooling block, which includes the cooling flow path, integrally configured such that the frame 100 has the apertures 130 provided in the opposite side surfaces of the lower end thereof, and the pipe 200 is inserted through the apertures 130, which simplifies the structure of the battery-cooling device, thereby further reducing manufacturing costs compared to a conventional battery-cooling device.

Moreover, the frame 100 may include a pipe support part 110 disposed on a lower surface of the frame 100. As mentioned above, the pipe 200 may be inserted through each of the apertures 130 provided in the opposite side surfaces of the lower end of the frame 100, and the pipe support part 110 may be disposed on a middle position of the lower surface of the frame, and thus the pipe 200 inserted through the frame 100 may be supported more securely. Further, since the pipe support part 110 may be disposed on the middle position of the lower surface of the frame 100, while the pipe 200 is inserted through the aperture 130 provided in a first side surface of the frame 100, the pipe support part 110 may guide the pipe 200 to insert the pipe 200 more efficiently through the aperture 130 provided in a second side surface of the frame 100.

In addition, frame covers 140 may cover opposite side surfaces of the frames 100 after the plurality of frames 100 are laminated, and prevent foreign matter from being introduced into each of the battery cells 600 from the outside. The coolant may be introduced into each of the coolant inlets 300 for cooling the battery cell 600 when heat is produced in the battery cell 600, and each of the coolant inlets 300 may be combined on a first side surface of the lower end of the frame 100. According to an exemplary embodiment of the present invention, the coolant inlet 300 may be combined by bolting on the first side surface of the frame 100. However, this is merely an exemplary embodiment performed according to the present invention, and the coolant inlet 300 may be combined or mounted on the first side surface of the frame 100 in various ways.

Furthermore, the coolant inlet 300 may communicate with a first end of the pipe 200 inserted into the aperture. In other words, as shown in FIG. 6, when a coolant is introduced into the coolant inlet 300, the coolant may be introduced to the first end of the pipe 200 that communicates with the coolant inlet 300, and while the coolant introduced to the first end of the pipe 200 flows through the pipe 200, the coolant may absorb heat transferred to the TIM 700 from the battery cell 600, and accordingly may indirectly cool the battery cell 600.

Each of the coolant outlets 400 may be combined or mounted on the second side surface of the lower end of the frame 100. According to an exemplary embodiment of the present invention, the coolant outlet 400 may be combined or mounted by bolting on the second side surface of the frame 100. However, this is merely an exemplary embodiment performed according to the present invention, and the coolant outlet 400 may be mounted on the second side surface of the frame 100 in various ways. In addition, as shown in FIG. 3, after the coolant is introduced into the coolant inlet 300, the coolant may be introduced to the first end of the pipe 200 that communicates with the coolant inlet 300, and the coolant introduced to the first end of the pipe 200 may flow through the pipe 200, and may be discharged from the coolant outlet 400 that communicates with the second end of the pipe 200.

Accordingly, as shown in FIG. 3, when the plurality of frames 100 is laminated to form one battery module, the pipe 200, the coolant inlet 300, and the coolant outlet 400 may form the cooling flow path in the battery module, thereby providing a more simplified configuration and reducing manufacturing costs compared to the conventional battery-cooling device, which requires an additional cooling block including the cooling flow path other than the battery module.

As shown in FIG. 4, the TIM inlets 500 may be disposed at upper sides of the apertures 130 (e.g., at a location of the frame that is at a higher height than both of the coolant inlet and coolant outlet; above the apertures relative to the location of the end of the frame) while being provided in opposite side surfaces of the frame 100, with the TIM 700, which has the characteristic of a thermal interface, being introduced into the TIM inlets. In other words, the coolant inlet and coolant outlet are disposed closed to an end of the frame than the TIM inlets. In particular, the TIM 700 may be a thermal adhesive which has the characteristics both of a thermal interface and of an adhesive. As shown in FIG. 4, the TIM inlets 500 may be inclined downwards from the opposite side surfaces of the frame 100. Referring to FIGS. 5 and 6, after the battery cell 600 is mounted to each of the plurality of frames 100, and each of the plurality of frames 100 is laminated, the TIM 700 may be introduced into the TIM inlets 500, and then the TIM 700 may be applied to a portion of a lower end of the battery cell 600 and to the pipe 200, and by inclining the TIM inlets 500 downwards from the opposite side surfaces of the frame 100, the TIM 700 may be more evenly applied to the battery cell 600 and the pipe 200.

Meanwhile, referring to FIG. 7, the process in which the battery-cooling device for a vehicle cools the battery cell will be described according to the present invention. First, when heat is produced in the battery cell 600, the heat may be transferred from the battery cell 600 to the TIM 700 applied to the lower end of the battery cell 600, and then the heat may be transferred to the pipe 200 to which the TIM 700 is applied. Additionally, through a coolant circulation process in which the coolant is introduced into the coolant inlet 300, flows through the pipe 200, and is discharged from the coolant outlet 400, the battery-cooling device may cool the battery cell 600 due to the use of an indirect water-cooling method.

Figure 8:
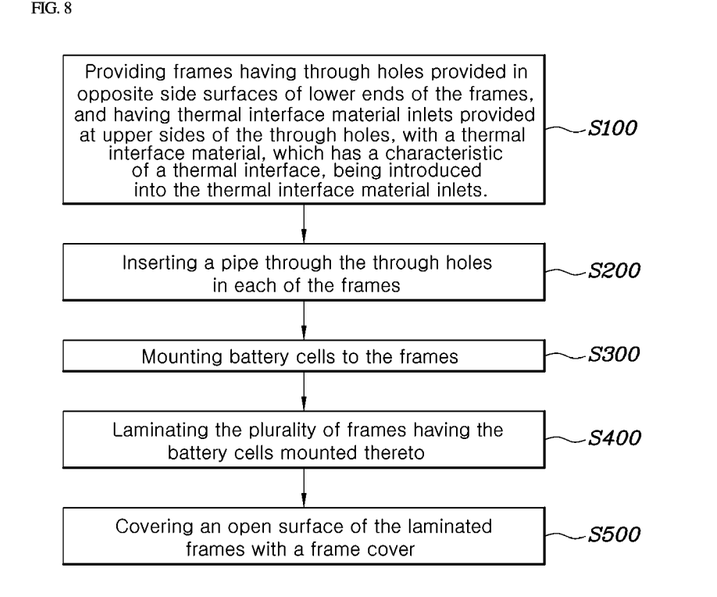
FIG. 8 is a flowchart showing a manufacturing method of the battery-cooling device according to an exemplary embodiment of the present invention.

FIG. 8 is a flowchart showing a manufacturing method of the battery-cooling device for a vehicle according to an exemplary embodiment of the present invention. As shown in FIG. 8, the manufacturing method may include providing the plurality of frames having the apertures provided in the opposite side surfaces of lower ends of the frames, and having the TIM inlets disposed at upper sides of the apertures, with the TIM, which has the characteristic of a thermal interface, being introduced into the TIM inlets; inserting the pipe through the apertures in each of the frames; mounting the battery cells to the plurality of frames; laminating the plurality of frames having the battery cells mounted thereto; and covering open surfaces of the laminated frames with the frame covers, and may further include introducing the TIM into the TIM inlets and hardening the TIM after covering the open surfaces of the laminated frames with the frame covers.

Meanwhile, the technological characteristic in each step of the manufacturing method of the battery-cooling device for a vehicle according to the present invention and the technological characteristics by which the battery cells are cooled by the battery-cooling device for a vehicle manufactured according to the steps of the manufacturing method described above in detail are the same as technological characteristics of the battery-cooling device for a vehicle as described above, and thus a detailed description thereof will be omitted.

What is claimed is:

1. A battery-cooling device for a vehicle, comprising:
a plurality of frames, wherein each of the plurality of frames has a battery cell mounted thereto and apertures provided in both side surfaces of lower ends thereof;
a pipe inserted through the apertures;
a coolant inlet mounted on a first side surface of a lower end of each of the plurality of frames and communicating with a first end of the pipe, a coolant being introduced into the coolant inlet;
a coolant outlet mounted on a second side surface of the lower end of each of the plurality of frames and communicating with a second end of the pipe, the coolant being discharged from the coolant outlet; and
a thermal interface material inlet disposed at upper sides of the apertures while being provided in both side surfaces of the frame,
wherein a thermal interface material, which has a characteristic of a thermal interface, is introduced into the thermal interface material inlet.

2. The battery-cooling device of claim 1, wherein the thermal interface material inlet is inclined downwards from both side surfaces of the frame.

3. The battery-cooling device of claim 1, wherein the thermal interface material introduced into the thermal interface material inlet is applied to a portion of a lower end of each of the battery cells and to the pipe.

4. The battery-cooling device of claim 1, wherein the frame includes a pipe support part disposed on a lower surface thereof, the pipe support part supporting the pipe inserted through the apertures.

5. The battery-cooling device of claim 1, further comprising:
a frame cover that covers open surfaces of the frames after the plurality of frames is laminated.

6. The battery-cooling device of claim 1, wherein the pipe, the coolant inlet, and the coolant outlet form a cooling flow path in the battery module.

7. A manufacturing method of a battery-cooling device for a vehicle, comprising:
providing a plurality of frames having apertures provided in both side surfaces of lower ends of the frames, and having thermal interface material inlets disposed at upper sides of the apertures, wherein a thermal interface material, which has a characteristic of a thermal interface, is introduced into the thermal interface material inlets;

inserting a pipe through the apertures in each of the frames;

mounting battery cells to the plurality of frames;

laminating the plurality of frames having the battery cells mounted thereto; and covering open surfaces of the laminated frames with frame covers, resulting in the battery-cooling device a claim 1.

8. The manufacturing method of claim 7, further comprising:

introducing the thermal interface material into the thermal interface material inlets; and hardening the thermal interface material after covering the open surfaces of the laminated frames with the frame covers.

9. The manufacturing method of claim 7, wherein the thermal interface material inlet is formed to incline downwards from both side surface of the frame.

* * * * *